(12) United States Patent
Murasumi et al.

(10) Patent No.: US 10,005,392 B2
(45) Date of Patent: Jun. 26, 2018

(54) OBJECT ALARM DEVICE AND OBJECT ALARM METHOD

(71) Applicant: FUJITSU TEN LIMITED, Kobe-shi, Hyogo (JP)

(72) Inventors: Hiroki Murasumi, Kobe (JP); Yuuki Matsumoto, Kobe (JP); Shigeto Takeuchi, Kobe (JP); Akihide Fujio, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 43 days.

(21) Appl. No.: 15/137,206

(22) Filed: Apr. 25, 2016

(65) Prior Publication Data

US 2016/0355131 A1    Dec. 8, 2016

(30) Foreign Application Priority Data

Jun. 8, 2015    (JP) ................. 2015-116073

(51) Int. Cl.
*B60Q 1/00* (2006.01)
*B60Q 9/00* (2006.01)
*B60R 1/00* (2006.01)
*B62D 15/02* (2006.01)
*G06T 11/60* (2006.01)
*G06K 9/00* (2006.01)

(52) U.S. Cl.
CPC ............... *B60Q 9/008* (2013.01); *B60R 1/00* (2013.01); *B62D 15/029* (2013.01); *B62D 15/0295* (2013.01); *G06K 9/00805* (2013.01); *G06T 11/60* (2013.01); *B60R 2300/308* (2013.01)

(58) Field of Classification Search
None
See application file for complete search history.

(56) References Cited

U.S. PATENT DOCUMENTS

| 2002/0183429 | A1* | 12/2002 | Itoh | ................. C08K 5/0016 524/352 |
| 2006/0274147 | A1* | 12/2006 | Chinomi | ................. B60R 1/00 348/118 |
| 2007/0053551 | A1* | 3/2007 | Kubo | ................. B60R 1/00 382/106 |
| 2013/0027196 | A1* | 1/2013 | Yankun | ............. G06K 9/00805 340/435 |

(Continued)

FOREIGN PATENT DOCUMENTS

JP    2007-087337 A    4/2007
JP    2011-035777 A    2/2011

*Primary Examiner* — Wayne Young
*Assistant Examiner* — Renee Dorsey
(74) *Attorney, Agent, or Firm* — Oliff PLC

(57) ABSTRACT

There is provided an object alarm device and an object alarm method, which can surely alarm a driver of a high-risk target object. The object alarm device according to the embodiment includes a detecting unit, a selecting unit and, an alarm information generating unit. The detecting unit detects one or more objects from images captured on a movable body. The selecting unit selects a moving object and a still object from among the objects detected by the detecting unit, in which the still object has a contact possibility with the movable body. The alarm information generating unit generates alarm information on the objects selected by the selecting unit.

7 Claims, 5 Drawing Sheets

(56) References Cited

U.S. PATENT DOCUMENTS

2013/0107051 A1* 5/2013 Maruoka ............... H04N 7/183
  348/148
2013/0242101 A1  9/2013 Schneider et al.
2015/0187019 A1* 7/2015 Fernandes ............. G06Q 40/08
  705/4

* cited by examiner

| DISTANCE BETWEEN VEHICLE AND OBJECT | WARNING TYPE | COOPERATING IMAGE |
|---|---|---|
| 0.5 m TO 2.0 m | BLINKING OF WARNING SYMBOL |  |
| | WARNING SOUND | |
| 0 m TO 0.5 m | BLINKING OF WARNING SYMBOL |  |
| | WARNING SOUND | |

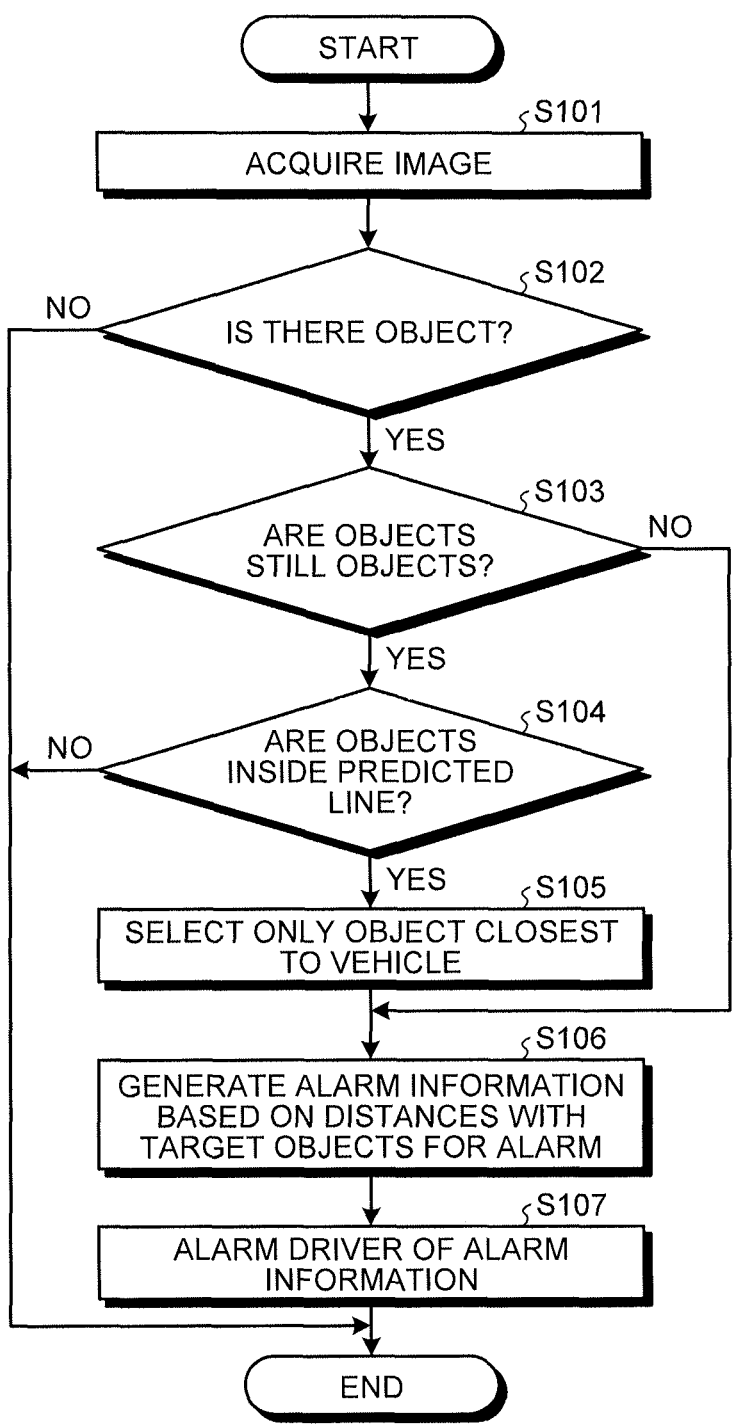

OBJECT ALARM DEVICE AND OBJECT ALARM METHOD

CROSS-REFERENCE TO RELATED APPLICATION

This application is based upon and claims the benefit of priority of the prior Japanese Patent Application No. 2015-116073, filed on Jun. 8, 2015, the entire contents of which are incorporated herein by reference.

FIELD

The embodiment discussed herein is directed to an object alarm device and an object alarm method.

BACKGROUND

There is known a conventional object alarm device that detects an object by using an image captured by a movable body such as a vehicle and alarms a driver of the detected object, in which the object exists around a vehicle and has a possibility that the vehicle is in contact with the object.

As an example, the object alarm device includes a device that changes a degree of highlighting and alarms a driver of the changed highlighting on the basis of priority sequence that should be reported to the driver with respect to the detected objects (see Japanese Laid-open Patent Publication No. 2007-87337, for example).

However, the device according to the technology described above alarms a driver of all detected objects. Therefore, it has a possibility that the driver may overlook a high-risk target object because the device has too much alarm information.

SUMMARY

According to an aspect of an embodiment, an object alarm device includes a detecting unit, a selecting unit and, an alarm information generating unit. The detecting unit detects one or more objects from images captured on a movable body. The selecting unit selects a moving object and a still object from among the objects detected by the detecting unit, in which the still object has a contact possibility with the movable body. The alarm information generating unit generates alarm information on the objects selected by the selecting unit.

BRIEF DESCRIPTION OF DRAWINGS

The present invention can be appreciated more completely and advantages thereof could be easily understood in the description of an embodiment below with reference to the accompanying drawings.

FIG. 7 is a flowchart illustrating a processing procedure that is executed by the object alarm device.

DESCRIPTION OF EMBODIMENTS

Hereinafter, an object alarm device and an object alarm method according to an embodiment of the present disclosure will be explained in detail with reference to the drawings. The embodiment disclosed below is not intended to limit the present invention. Although a case is explained in which a movable body is a vehicle in the following embodiment, the movable body may be an electric railcar, a ship, an airplane, for example.

Figure 1:
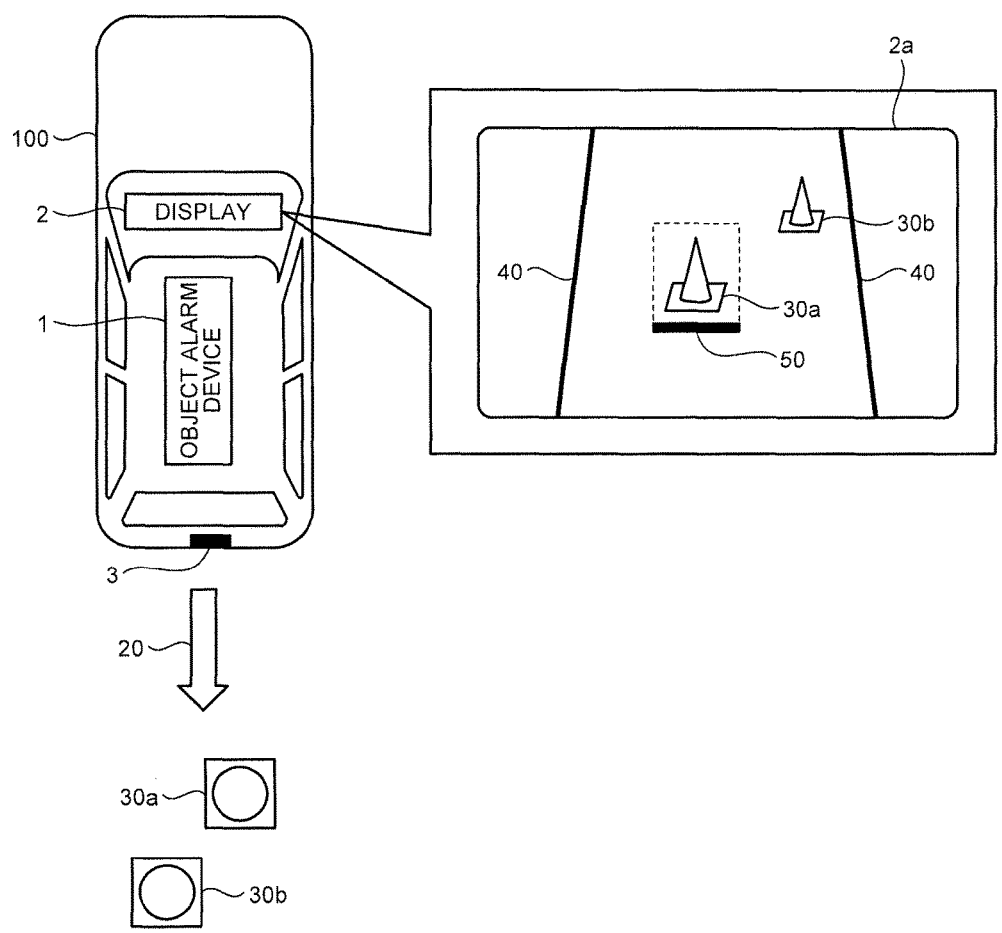
FIG. 1 is a schematic diagram illustrating an object alarm method according to an embodiment.

FIG. 1 is a schematic diagram illustrating an object alarm method according to an embodiment. An image displayed on a display 2 as illustrated in FIG. 1 is a simplified version of a superimposed image according to the embodiment.

As illustrated in FIG. 1, an object alarm device 1 is mounted on a vehicle 100. Moreover, a camera 3 and the display 2 (alarm unit) is mounted on the vehicle 100. The camera 3 captures the image of the rear of the vehicle 100. In FIG. 1, a scene is illustrated where the vehicle 100 straight reverses to the direction of an arrow 20. Still objects 30a and 30b exist in the rear, namely, in a traveling direction of the vehicle 100. Hereinafter, a plurality of still objects may be collectively referred to as a still object 30.

As illustrated in FIG. 1, a superimposed image 2a is displayed on the display 2. The superimposed image 2a is obtained by superimposing an image captured by the camera 3 and an image generated by the object alarm device 1. The still objects 30a and 30b of the superimposed image 2a are an image captured by the camera 3. On the other hand, predicted lines 40 and a warning symbol 50 of the superimposed image 2a are an image generated by the object alarm device 1.

Herein, the predicted lines 40 indicate both ends of a band-shaped predicted trajectory of the vehicle 100, namely, border lines of the predicted trajectory. The border lines indicate, for example, a pair of lines. In the following explanations, an area sandwiched by the pair of predicted lines 40 and the other area may be respectively referred to as "the inside of the predicted lines 40" and "the outside of the predicted lines 40".

The warning symbol 50 indicates a graphic or a character that emphasizes the still object 30a that is a target object for alarm. In the present embodiment, although a case is explained in which the warning symbol 50 is a line corresponding to a base of a frame that encloses the target object, the warning symbol 50 may be a frame that encloses the target object, or may a character or a graphic.

The object alarm device 1 may blink the warning symbol 50 with a predetermined period. Moreover, in the following explanations, the lower side of the display 2 indicates a position close to the vehicle 100, and the upper side of the display 2 indicates a position far from the vehicle 100.

As illustrated in FIG. 1, when the vehicle 100 reverses along the direction of the arrow 20, the still object 30 that first contacts with the vehicle 100 is the still object 30a that is within the traveling range of the vehicle 100 and is closest to the vehicle 100.

Therefore, in this case, the driver of the vehicle 100 requires most attention to the still object 30a. In other words, because the vehicle 100 contacts with the still object 30a before contacting with the still object 30b, the object alarm device 1 should preferentially alarm the driver of the presence of the still object 30a.

Therefore, in the present embodiment, the object alarm device 1 selects the still object 30a of the still objects 30a and 30b, which has the highest contact possibility with the vehicle 100, and alarms the driver of only the presence of the selected still object 30a.

In other words, when a plurality of still objects exist within the traveling range of the vehicle 100, because the object alarm device 1 selects only the still object that has the highest contact possibility with the vehicle and alarms the driver of the still object, alarm information can be minimized and thus the driver can be surely alarmed of necessary information.

As described above, because the object alarm device 1 minimizes alarm information to be delivered to the driver, the object alarm device 1 assists, when there are two or more still objects, the driver to instantly determine which of the objects is the riskiest still object. Therefore, the object alarm device 1 can appropriately perform drive assist by alarm information.

Figure 2:
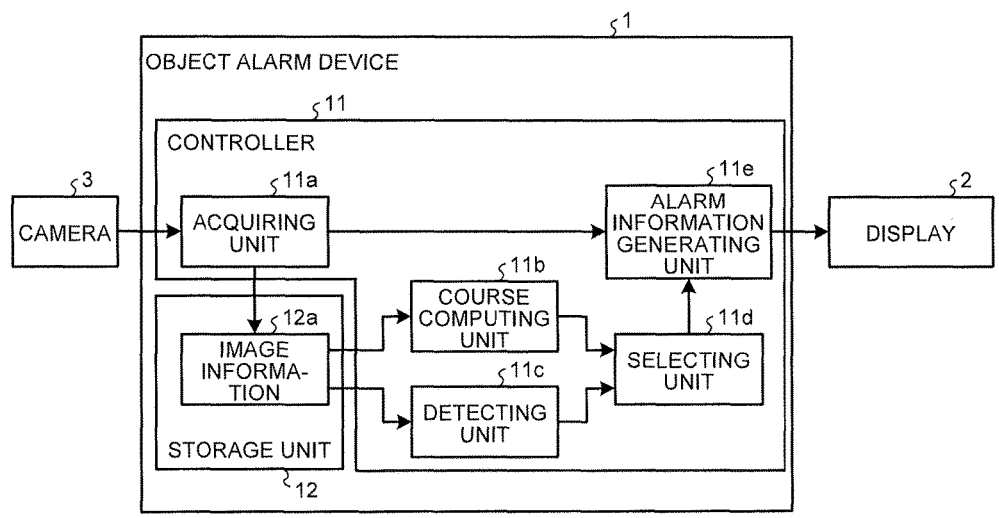
FIG. 2 is a block diagram illustrating an object alarm device according to the embodiment.

Next, the internal configuration of the object alarm device 1 will be explained with reference to FIG. 2. FIG. 2 is a block diagram illustrating the configuration of the object alarm device 1 according to the embodiment. In FIG. 2, only components needed to explain the characteristic of the present embodiment are illustrated, and general components are omitted.

As illustrated in FIG. 2, the object alarm device 1 includes a controller 11 and a storage unit 12. The display 2 and the camera 3 are connected to the object alarm device 1. Moreover, one or both of the display 2 and the camera 3 may be included in the object alarm device 1.

The controller 11 is a central processing unit (CPU), for example, and totally controls the object alarm device 1. Moreover, the controller 11 includes an acquiring unit 11a, a course computing unit 11b, a detecting unit 11c, a selecting unit 11d, and an alarm information generating unit 11e.

The camera 3 is, for example, a rear camera mounted on the rear of the vehicle 100 to capture an image of the rear of the vehicle 100. The camera 3 outputs the captured image to the acquiring unit 11a in accordance with the set frame rate. The installation position of the camera 3 is not limited to the rear of the vehicle 100, and the image capturing area is not limited to the rear of the vehicle 100.

The acquiring unit 11a is an input port, for example, and acquires an image captured by the camera 3. The acquiring unit 11a outputs the acquired captured image to the alarm information generating unit 11e. Moreover, the acquiring unit 11a outputs the captured image as image information 12a to the storage unit 12.

The storage unit 12 is a semiconductor memory device such as a Random Access Memory (RAM) and a flash memory, or is a storage device such as a hard disk and an optical disc.

The image information 12a is "captured images" consisting of a plurality of frames input from the camera 3 via the acquiring unit 11a. Moreover, the image information 12a is output to the course computing unit 11b and the detecting unit 11c.

The course computing unit 11b computes the course, namely, the predicted trajectory of the vehicle 100 on the basis of the image information 12a. More specifically, the course computing unit 11b extracts a mobile vector (optical flow) that links the same characteristic points from the images consisting of the plurality of frames included in the image information 12a and arranged in time series, and predicts the course of the vehicle 100 on the basis of the extracted optical flow.

In other words, the predicted trajectory of the vehicle 100 is determined by a steering angle, and different steering angles cause different predicted trajectories. Therefore, it is possible to compute the latest predicted trajectory of the vehicle 100 from the latest optical flow. Furthermore, it is possible to compute the latest steering angle from the latest predicted trajectory.

Therefore, it is possible to estimate the latest steering angle on the basis of an optical flow, and compute a predicted trajectory of the vehicle 100 when the vehicle travels at the steering angle by using a computing process in which a steering angle is used as a parameter.

Then, the course computing unit 11b computes the predicted trajectory of the vehicle 100 on the basis of the predicted course and the width of the vehicle 100. The border lines of the predicted trajectory are the pair of predicted lines 40 described above (see FIG. 1). The course computing unit 11b then outputs "predicted trajectory information" including the computed predicted trajectory to the selecting unit 11d.

The width of the pair of predicted lines 40 corresponds to the width of the vehicle 100. However, the width of the lines can be adjusted to be wider than the width of the vehicle 100, for example. Moreover, instead of computing the predicted lines 40 on the basis of the image information 12a, the course computing unit 11b may compute the predicted lines 40 on the basis of the steering angle detected by a steering sensor (not illustrated), for example.

The detecting unit 11c detects an object such as for example a still object and a moving object on the basis of the image information 12a. More specifically, the detecting unit 11c detects an object from the image information 12a on the basis of the optical flow described above, for example.

For example, when there is an object of an optical flow different from the other optical flows in length and direction, the detecting unit 11c can determine this object as a moving object and objects of the other optical flows as a still object. As described above, the detecting unit 11c detects both of the still object and the moving object. Moreover, the object alarm device 1 may separately detect the still object and the moving object by using separated processing units that operate in parallel.

When detecting an object, the detecting unit 11c outputs "object information" to the selecting unit 11d. The object information is information that is obtained by associating position information of the object that includes a distance between the detected object and the vehicle 100 with a classification that indicates whether the detected object is the still object or not the moving object.

The selecting unit 11d selects a target object for alarm from among objects detected by the detecting unit 11c. More specifically, the selecting unit 11d first acquires the predicted trajectory information from the course computing unit 11b and the object information from the detecting unit 11c.

Next, the selecting unit 11d selects the target object for alarm by the procedure to be described later, and outputs "selected object information" that is information on the selected object to the alarm information generating unit 11e. Moreover, the selecting unit 11d outputs the predicted trajectory information received from the course computing unit 11b to the alarm information generating unit 11e.

In this case, the selecting unit 11d selects all moving objects when the moving objects are included in the object information described above, and checks object information of the detected still objects with the predicted trajectory information described above when the still objects are included in the object information. As the result of checking, the selecting unit 11d selects a still object located inside of the predicted lines 40 from among the detected still objects.

Because it is hard to predict the movement of the moving object, the object alarm device 1 considers that the moving objects have a high degree of risk by which the moving objects contact with the vehicle 100, and sets all the moving objects as targets for alarm. On the other hand, because the object alarm device 1 sets, among the still objects, only the object located in the predicted trajectory as a target for alarm, the object alarm device 1 can surely alarm the driver of a high-risk target object. Moreover, the selecting unit 11d may select a still object located in the predicted trajectory and closest to the vehicle 100 from among the detected still objects.

In other words, a still object existing outside the predicted trajectory, or a still object that is second or more closest to the vehicle 100, even if it exists inside the predicted trajectory, is not selected, namely, is not set as a target for alarm.

In this case, the selecting unit 11d selects, from among the detected still objects, a still object having a high possibility that this still object first contacts with the vehicle 100, and thus assists the driver to instantly determine the riskiest still object.

When a plurality of moving objects at the same distance are detected, the selecting unit 11d selects moving objects of the previously determined number (two or three, for example) from among the plurality of moving objects located at the same distance from the vehicle 100. The reason is because limiting alarm information to be delivered at a time prevents the determination of the driver from being disturbed due to excessive alarm information.

This limitation may be applied to still objects. By doing so, when there are a plurality of moving objects at the same distance as the nearest still object, the number of moving objects as targets for alarm can be limited. Moreover, when there is the nearest plurality of still objects, the number of still objects as targets for alarm can be limited.

As another example, when the vehicle 100 is stopped, the selecting unit 11d once cancels the selection of the detected still object, for example. On the other hand, the selecting unit 11d continues to select the detected moving objects, and resumes the selection of the still object when the vehicle 100 starts to move.

The reason is that the object alarm device 1 does not require to alarm the driver of the still object, because both of the vehicle 100 and the still object are stopped and thus the vehicle 100 has a low contact possibility with the still object when the vehicle 100 is stopping.

The alarm information generating unit 11e generates a superimposed image obtained by superimposing an image captured by the camera 3 and a generated image. The generated image is, for example, the predicted lines 40 and the warning symbol 50 described above (see FIG. 1). More specifically, the alarm information generating unit 11e acquires the image captured by the camera 3 via the acquiring unit 11a, and acquires the selected object information and the predicted trajectory information computed by the course computing unit 11b from the selecting unit 11d.

Then, the alarm information generating unit 11e generates a superimposed image that is obtained by superimposing, on the image captured by the camera 3, the predicted lines 40 included in the predicted trajectory information computed by the course computing unit 11b and the warning symbol 50 such as a frame and a line emphasizing the object selected by the selecting unit 11d.

The alarm information generating unit 11e generates warning sound to alarm the driver of the presence of the detected object. The warning sound is changed in accordance with a distance between the vehicle 100 and the object selected by the selecting unit 11d. The warning sound is sound different from pulsed sound that is generated during the reverse of the gear of the vehicle 100.

As described above, because the warning sound is different from sound during the reverse of the gear, it is possible to prevent false recognition of the driver. Moreover, the blinking period of the warning symbol 50 may cooperate with the period of warning sound. This point is explained below along with the details of warning sound with reference to FIG. 6.

As described above, the alarm information generating unit 11e outputs to the display 2 the superimposed image to visually warn the driver and the warning sound to acoustically warn the driver. The display 2 is, for example, a liquid crystal display with a speaker, and displays the superimposed image generated from the alarm information generating unit 11e and generates the warning sound.

When the display 2 does not have a voice output function, the alarm information generating unit 11e may output warning sound to an amplifier (not illustrated) or a speaker (not illustrated) mounted on the vehicle 100.

Figure 3:
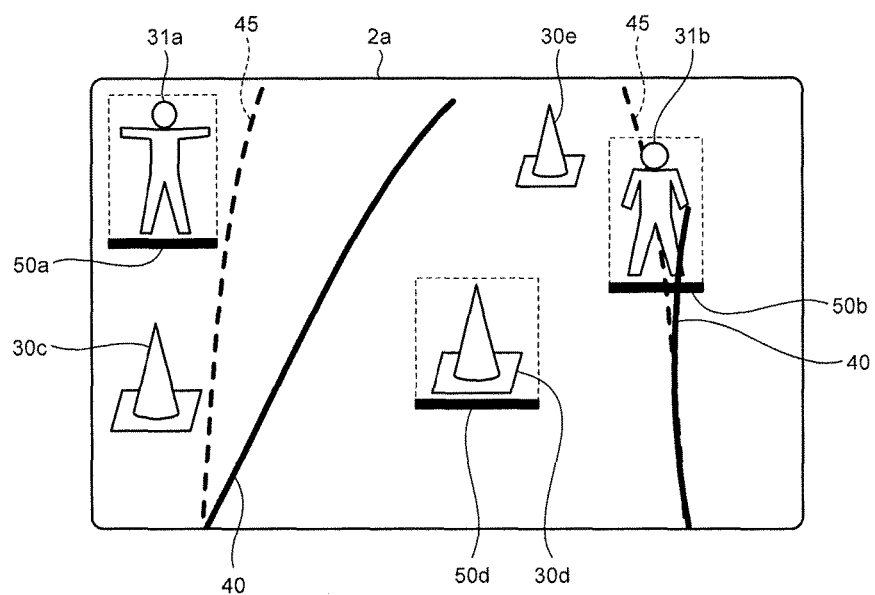
FIG. 3 is a diagram illustrating an example of a superimposed image.

Next, the superimposed image output from the object alarm device 1 according to the embodiment will be explained with reference to FIG. 3. FIG. 3 is a diagram illustrating an example of the superimposed image. As illustrated in FIG. 3, the superimposed image 2a includes the predicted lines 40, vehicle-width lines 45, still objects 30c, 30d, 30e, and moving objects 31a, 31b. Hereinafter, the plurality of moving objects may be collectively referred to as moving objects 31 in some cases.

Herein, the vehicle-width lines 45 are a pair of lines that indicates the width of the vehicle 100 in the present direction of the vehicle 100. In FIG. 3, the vehicle-width lines 45 are illustrated with dotted lines. However, if the vehicle-width lines 45 can be distinct from the predicted lines 40, the vehicle-width lines 45 may have another display mode. Moreover, as illustrated by the predicted lines 40, a scene in which the vehicle 100 goes back in a right direction is illustrated in FIG. 3.

As illustrated in FIG. 3, the superimposed image 2a includes a warning symbol 50d corresponding to the still object 30d, a warning symbol 50a corresponding to the moving object 31a, and a warning symbol 50b corresponding to the moving object 31b.

Herein, each the warning symbol 50 is equivalent to the base of a frame that encloses an object as a warning target. The reason is because the position of the base of the frame corresponds to a distance with each object. Furthermore, the reason is because the driver can easily catch a sense of distance with an object as a warning target by emphasizing the base. Moreover, a part (dotted lines illustrated in FIG. 3) other than the base of the frame may be displayed to be more poorly visible than the base, or may not be displayed.

As illustrated in FIG. 3, the still object 30c exists at a position closest to the vehicle 100 among the detected objects. However, because the still object 30c is a still object that is located outside the predicted lines 40, the still object 30c is not a target for alarm.

Although the still object 30e is located inside the predicted lines 40, the still object 30e is a still object that is located at a position more distant from the vehicle 100 than the still object 30d. On the other hand, the still object 30d is a still object that is inside the predicted lines 40 and is located at a position closest to the vehicle 100.

For this reason, as described above, because the object alarm device 1 selects the still object 30d as a target for alarm from among the plurality of still objects 30, the warning symbol 50d is displayed on the base of the frame that encloses the still object 30d.

On the other hand, as described above, the object alarm device 1 sets all the detected moving objects 31 as targets for alarm. The reason is because the detected moving objects 31 can suddenly change their moving directions and moving speeds to rapidly contact with the vehicle 100. Therefore, it is preferable that the object alarm device 1 alarms the driver of the moving objects 31 at the time when the moving objects 31 are detected. For that reason, the detected moving objects 31 are set as targets for alarm regardless of the inside and outside of the projected line 40 and the moving directions of the moving objects 31.

Therefore, as illustrated in FIG. 3, both of the moving object 31a located outside the predicted lines 40 and the moving object 31b located inside the predicted lines 40 are set as targets for alarm. For that reason, the warning symbols 50a, 50b are respectively displayed on the bases of the frames that enclose the moving objects 31a, 31b.

Figure 4:
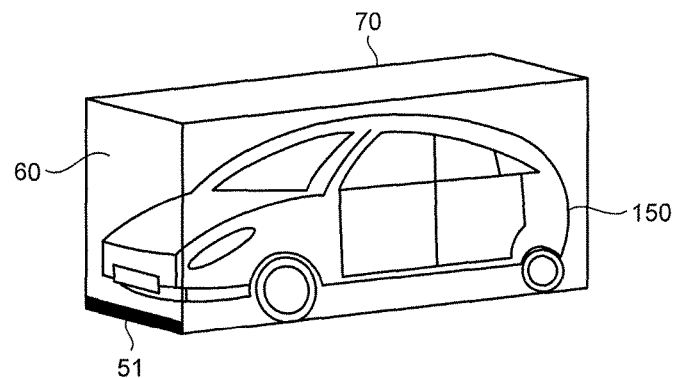
FIG. 4 is a diagram illustrating an example of a warning symbol.

Next, the alarm information generated by the alarm information generating unit 11e will be further explained in detail with reference to FIGS. 4 to 6. FIG. 4 is a diagram illustrating an example of the warning symbol 50. When an image of a vehicle 150 is captured, FIG. 4 indicates which position of the vehicle 150 the warning symbol 50 is displayed at.

A rectangular solid 70 illustrated in FIG. 4 is a frame that covers the whole of the vehicle 150, and is computed by the detecting unit 11c, for example. The rectangular solid 70 includes a surface 60 perpendicular to the imaging direction of the camera 3. The surface 60 includes a point (for example, bumper) on the vehicle 150 at which the camera 3 and the vehicle 150 are closest to each other. Moreover, the detecting unit 11c may generate the rectangular solid 70 to be slightly larger than the vehicle 150.

Herein, a base 51 illustrated in FIG. 4 is a line through which the surface 60 contacts with a road surface. As described above, because the base 51 is emphatically displayed with respect to the warning symbol 50 (see FIG. 3), the driver can easily catch a sense of distance between an object and the vehicle 150 or the like.

According to this, when there is the plurality of warning symbols 50, for example, the driver can instantly grasp a positional relationship with the plurality of target objects.

Next, an example in which the display mode of the warning symbol 50 is changed in accordance with a distance will be explained with reference to FIG. 5. FIG. 5 is a diagram illustrating an example of a display mode change of the warning symbol 50. In FIG. 5, moving objects 31 are employed as an example. However, it is considered that the same display mode is applied to all the detected objects. Moreover, in FIG. 5, the vehicle-width lines 45 illustrated in FIG. 4 are omitted to simplify its explanation.

Figure 5:
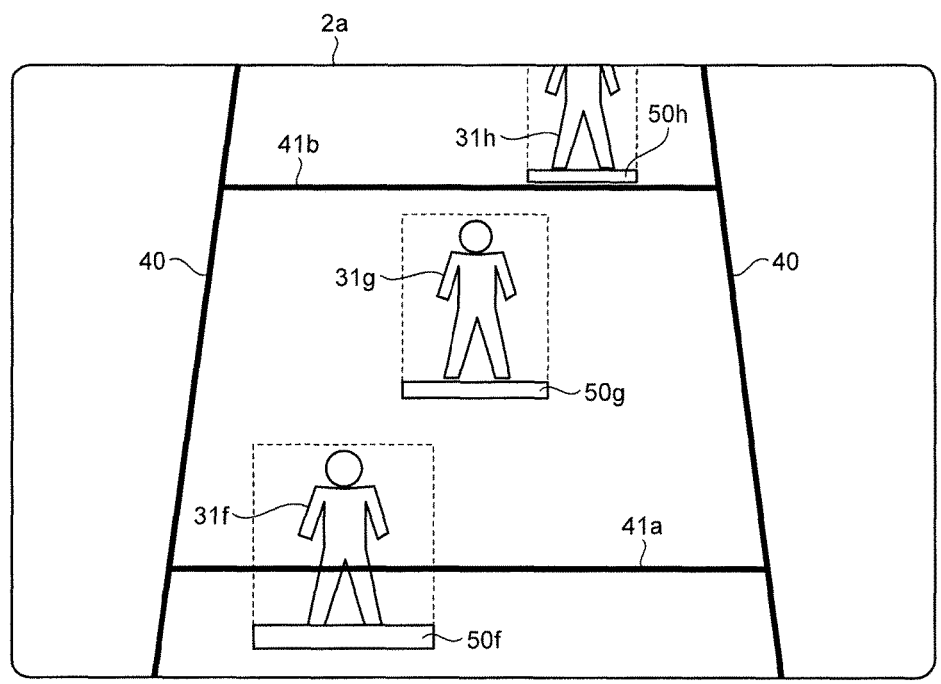
FIG. 5 is a diagram illustrating an example of a display mode change of the warning symbol.

As illustrated in FIG. 5, the predicted lines 40 and auxiliary lines 41a, 41b indicative of a distance between the vehicle 100 and objects are displayed on the superimposed image 2a. For example, the auxiliary line 41a is a line that indicates a position of 0.5 meters from the vehicle 100, and the auxiliary line 41b is a line that indicates a position of 2.0 meters from the vehicle 100.

Moving objects 31f, 31g, 31h, and warning symbols 50f, 50g, 50h respectively corresponding to the moving objects are displayed inside the predicted lines 40 on the superimposed image 2a.

As illustrated in FIG. 5, the moving object 31f is located between the vehicle 100 and the auxiliary line 41a (for example, 0 to 0.5 meters), the moving object 31g is located between the auxiliary lines 41a and 41b (for example, 0.5 to 2.0 meters), and the moving object 31h is located at a position distant from the auxiliary line 41b (for example, 2.0 meters or more).

The alarm information generating unit 11e as described above generates alarm information obtained by changing the color of the base of a warning image in accordance with the distance of the detected object. In this case, it is preferable to employ a color to catch the attention of the driver as the distance between the vehicle 100 and the object is smaller. The reason is because there is a higher possibility that the vehicle 100 contacts with the detected object as the distance between the vehicle 100 and the object is smaller.

Therefore, the alarm information generating unit 11e generates alarm information by which the base of the warning symbol 50f of the moving object 31f located between 0 to 0.5 meters is displayed with red, the base of the warning symbol 50g of the moving object 31g located between 0.5 to 2.0 meters is displayed with orange, and the base of the warning symbol 50h of the moving object 31h located at the distant position 2.0 meters or more from the vehicle is displayed with green, for example.

As described above, because the color of the base of a warning image is changed and displayed on the basis of a distance with an object, it is possible to easily catch the distance with the object from a higher perspective and instantly determine the distance with the object by using the color of the warning symbol 50. Moreover, the thickness and width of the base of the warning symbol 50 may be increased as the distance is nearer.

As described above, although it has been explained that the display mode of the warning symbol 50 is changed in accordance with a distance with an object with reference to FIG. 5, a distance up to an object is generally computed by using the camera 3 as a starting point. However, when the installation position of the camera 3 significantly departs from the leading end (for example, leading end of rear bumper) of the vehicle 100 in the imaging direction of the camera 3, the driver is easy to misrecognize a relative distance to an object.

Therefore, in order to make the driver recognize a positional relationship with an object more clearly, the object alarm device 1 according to the present embodiment can change the starting point of a distance up to the object from the installation position of the camera 3 to the leading end of the vehicle 100 in the imaging direction of the camera 3.

For example, if the storage unit 12 previously stores as a correction value a distance between the installation position of the camera 3 and the leading end of the vehicle 100 in the imaging direction of the camera 3, and the course computing unit 11b or the detecting unit 11c corrects the computed distance by using the correction value, it is possible to set the leading end of the vehicle 100 in the imaging direction of the camera 3 as the starting point of the distance up to the object.

As a result, the object alarm device 1 can generate the superimposed image 2a on which the distance through which an object contacts with the vehicle 100 is accurately reflected. Therefore, it is possible to appropriately perform drive assist.

Next, an example of warning sound generated from the alarm information generating unit 11e as described above will be explained with reference to FIG. 6. FIG. 6 is a diagram illustrating an example of warning sound. Herein, "T" illustrated in FIG. 6 is two seconds, for example. However, "T" may be the arbitrary number of seconds.

Figure 6:
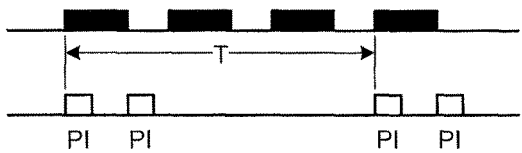
FIG. 6 is a diagram illustrating an example of warning sound.
Figure 6:
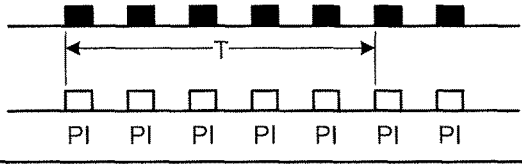

As illustrated in FIG. 6, when a distance between the vehicle 100 and the detected object is between 0.5 and 2.0 meters, for example, the alarm information generating unit 11e blinks the warning symbol 50 three times for the time "T" and generates the warning sound called a peep two times, for example.

On the other hand, when a distance between the vehicle 100 and the object is between 0 and 0.5 meters, the alarm information generating unit 11e blinks the warning symbol 50 five times for the time "T" and generates the warning sound called a peep five times, for example.

As described above, because the blinking period of the warning symbol 50 and the generation timing of warning sound are changed in accordance with a distance between the vehicle 100 and the object while making the warning symbol 50 cooperate with the warning sound, the driver can recognize the presence of the object and a distance between the vehicle 100 and the object by using an acoustic sense as well as a visual sense of the driver.

Because the warning sound is changed in accordance with a distance with an object, the driver of the vehicle 100 can recognize the distance with the object by using the warning sound without viewing the display 2.

The case has been explained where the blinking period of the warning symbol 50 is changed with reference to FIG. 6. However, the display 2 may be provided with a luminous body on its frame, for example, to blink the luminous body.

Next, object alarm processing executed by the object alarm device 1 will be explained with reference to FIG. 7. FIG. 7 is a flowchart illustrating the procedure of object alarm processing that is executed by the object alarm device 1.

As illustrated in FIG. 7, when the acquiring unit 11a acquires an image captured by the camera 3 (Step S101), the detecting unit 11c determines the presence or absence of object(s) in the image (Step S102). When the detecting unit 11c does not detect an object (Step S102: No) in the determination of Step S102, the process is terminated.

On the other hand, when the detecting unit 11c detects object(s) (Step S102: Yes) in the determination of Step S102, the detecting unit 11c determines whether the detected object(s) is(are) a still object (Step S103).

When the detecting unit 11c determines that the detected object(s) is(are) not a still object (Step S103: No) in the determination of Step S103, the processes after Step S106 are executed because the object(s) detected by the detecting unit 11c is(are) a moving object and thus all the objects are targets for alarm.

On the other hand, when the object(s) detected by the detecting unit 11c is(are) a still object (Step S103: Yes), the selecting unit 11d determines whether the position(s) of the still object(s) is(are) inside the predicted line 40 of the vehicle 100 (Step S104). When the still object(s) is(are) located outside the predicted line 40 of the vehicle 100 (Step S104: No) in the determination of Step S104, the process is terminated because there is not a contact possibility between the vehicle 100 and the still object(s).

On the other hand, when the still object(s) is(are) inside the predicted line 40 of the vehicle 100 (Step S104: Yes) in the determination of Step S104, the selecting unit 11d selects an object closest to the vehicle 100 from among the still object(s) detected inside the predicted line 40 (Step S105).

Next, the alarm information generating unit 11e generates alarm information on the basis of distances between the vehicle 100 and the still object selected in Step S105 and all the moving objects detected in Step S103 (Step S106). Then, the object alarm device alarms the driver of the alarm information by using the display 2 (Step S107), and terminates the process.

As described above, the object alarm device 1 according to the embodiment includes the detecting unit 11a, the selecting unit 11d, and the alarm information generating unit 11e. The detecting unit 11a detects objects from images captured on a movable body. The selecting unit 11d selects moving objects and a still object having a contact possibility with the movable body from among the objects detected by the detecting unit 11a. Then, the alarm information generating unit 11e generates alarm information on the objects selected by the selecting unit 11d.

Therefore, the object alarm device 1 according to the embodiment can surely alarm a driver of high-risk target objects.

In the embodiment described above, the case has been explained where the vehicle 100 moves backward as an example. However, the present embodiment is not limited to this. In other words, a case where the vehicle 100 moves forward can be applied to the present embodiment. In this case, the object alarm device 1 can alarm a driver of target objects that exist in front of the vehicle 100 during the forward movement of the vehicle 100.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object alarm device comprising:
a processor programmed to:
  detect objects from images captured on a movable body;
  select one or more moving objects and one or more still objects from among the detected objects, the selected one or more still objects having a contact possibility with the movable body and being located in a moving direction and in a moving range of the movable body; and
generate alarm information on the selected one or more moving objects and the selected one or more still objects,
wherein the processor is programmed to, when the objects are detected at a same distance, select a predetermined number of objects from among the detected objects.

2. The object alarm device according to claim 1, wherein the processor is programmed to generate the alarm information that is obtained by emphasizing a base of a frame that encloses each of the detected one or more objects.

3. The object alarm device according to claim 1, wherein the processor is programmed to generate the alarm information that is obtained by emphasizing a base of a frame that encloses each of the detected objects.

4. The object alarm device according to claim 2, wherein the processor is programmed to generate the alarm information that is obtained by changing a display mode of the base on a basis of a distance between the movable body and each of the detected objects.

5. The object alarm device according to claim 3, wherein the processor is programmed to generate the alarm information that is obtained by changing a display mode of the base on a basis of a distance between the movable body and each of the detected objects.

6. An object alarm method comprising:
   detecting objects from images captured on a movable body; and
   selecting one or more moving objects and one or more still objects from among the detected objects, the selected one or more still objects having a contact possibility with the movable body and being located in a moving direction and in a moving range of the movable body; and
   generating alarm information on the selected one or more moving objects and the selected one or more still objects,
   wherein the selecting includes selecting, when the objects are detected at a same distance, a predetermined number of objects from among the detected objects.

7. An object alarm device comprising:
   a processor configured to:
      detect objects from images captured on a movable body; and
      select one or more moving objects and one or more still objects from among the detected objects, the selected one or more still objects having a contact possibility with the movable body,
   wherein the processor is further configured to:
      when the detected one or more objects are determined to be a still object, determine whether the still object is inside the moving range and in the moving direction of the movable body, and
      when the detected one or more objects are determined to be a moving object, determine whether the moving object is in the moving direction of the movable body, and, when the moving object is determined to be in the moving direction of the movable body, generate alarm information irrespective of whether the moving object is inside or outside the moving range, and
   wherein the processor is programmed to, when the objects are detected at a same distance, select a predetermined number of objects from among the detected objects.

* * * * *